United States Patent [19]

Archer et al.

[11] Patent Number: 5,723,969
[45] Date of Patent: Mar. 3, 1998

[54] HIGH VOLTAGE CHARGER

[75] Inventors: Stephen T. Archer, Sunnyvale;
Kenneth J. Carroll, Los Altos;
Benjamin D. Pless, Atherton, all of Calif.

[73] Assignee: Pacesetter, Inc., Sunnyvale, Calif.

[21] Appl. No.: 660,259

[22] Filed: Jun. 7, 1996

[51] Int. Cl.[6] .................... H01M 10/44; H01M 10/46
[52] U.S. Cl. ............................. 320/2; 320/5; 607/5
[58] Field of Search ................... 320/2, 5, 9, 13, 320/20, 32, 39, 49, 50; 128/668; 607/5, 6

[56] References Cited

U.S. PATENT DOCUMENTS

| | | | |
|---|---|---|---|
| 3,938,018 | 2/1976 | Dahl | 320/2 |
| 4,031,449 | 6/1977 | Trombly | 320/2 |
| 4,080,558 | 3/1978 | Sullivan | 320/39 |
| 4,082,097 | 4/1978 | Mann et al. | 320/32 X |
| 4,548,209 | 10/1985 | Wielders et al. | 128/419 |
| 4,830,006 | 5/1989 | Haluska et al. | 128/419 PG |
| 5,048,521 | 9/1991 | Pless et al. | 128/419 PG |
| 5,251,624 | 10/1993 | Bocek et al. | 607/6 |
| 5,265,588 | 11/1993 | Nelson et al. | 607/5 |

*Primary Examiner*—Edward Tso
*Attorney, Agent, or Firm*—Steven M. Mitchell

[57] ABSTRACT

A high voltage charger operates in a three-phase cycle. In a first phase, the high voltage charger operates at a fixed frequency. In a second phase, the high voltage charger operates at a variable frequency designed to draw a substantially constant average current from a power source. In the third phase, the high voltage charger returns to fixed frequency operation. The variable frequency is the reciprocal of the sum of an on-time and an off-time of the switch. In one embodiment, the on-time is provided by the time required for the switch to reach a predetermined maximum and the off-time is provided by the time over which a magnetic field in a transformer collapses.

20 Claims, 6 Drawing Sheets

HIGH VOLTAGE CHARGER

BACKGROUND OF THE INVENTION

1. Field of the Invention

The present invention relates to a high voltage charger powered by a battery. In particular, the present invention relates to a high voltage charger which draws a substantially constant current from the battery. The current draw from the battery can be chosen to be the maximum allowable without going over. Thus, the battery life is not shortend by drawing too much current and the charge time is minimized by drawing as much current as is allowed.

2. Discussion of the Related Art

Implantable cardioverter-defibrillator (ICDs) have been in use in patients suffering ventricular tachyarrhythmias. For example, one such ICD is described in U.S. Pat. No. 5,048,521 to B. Pless et al, entitled "Method for Combined Cardiac Pacing and Defibrillation", assigned to Ventritex, Inc., and issued on Sep. 17, 1991. In such an ICD, a high voltage charger is provided to charge storage capacitors to a high voltage. Upon detecting a ventricular fibrillation episode in the patient, these capacitors are rapidly charged and then discharged to deliver a high voltage shock to defibrillate the patient's heart. Because the ICD is implanted, it is especially important to maximize the useful life of the battery.

Charge time is inversely related to input power. Input power is equal to the product of input voltage and input current. Previous defibrillator charger designs draw less current from a lower voltage (more depleted) battery. Thus, input power and charge time change approximately as the squat of the battery voltage causing substantially longer charge times for a more depleted battery.

SUMMARY OF THE INVENTION

In accordance with the present invention, a high voltage charger and a method for high voltage charging are provided to draw a substantially constant current from a power source. If a substantially constant current is drawn from the power source, regardless of the cell voltage, the input power will change only in proportion to the battery voltage and not the square of that voltage and will therefore maintain a much more constant charge time over the life of the battery.

The high voltage charger of the present invention includes (i) a step-up transformer; (ii) a switch for alternately switching the electrical current off and on; (iii) a sensor sensing the magnitude of the electrical current; and (iv) a control circuit coupled to the switch and the sensor for controlling the switch, such that, when the sensor senses the magnitude of the electrical current to exceed a predetermined value, the control circuit disables flow of the electrical current.

In one embodiment, the sensor in the high voltage charger is built into the switch. Such a switch can be provided by a HEXSENSE1 current sensing device, available from International Rectifier Corporation. The high voltage charger also receives in the control circuit a voltage in the boost winding of the transformer. The control circuit enables flow of the electrical current in the switch when the voltage in the boost winding exceeds a second predetermined threshold.

In accordance with one aspect of the present invention, the high voltage charger operates selectively at either a fixed frequency or a variable frequency. In one embodiment, the high voltage charger controls the electrical current in a predetermined cycle, consisting of: a first fixed frequency phase, a variable frequency phase and a second fixed frequency phase.

The present invention is better understood upon consideration of the detailed description below and the accompanying drawings.

DETAILED DESCRIPTION OF THE PREFERRED EMBODIMENTS

Figure 1:
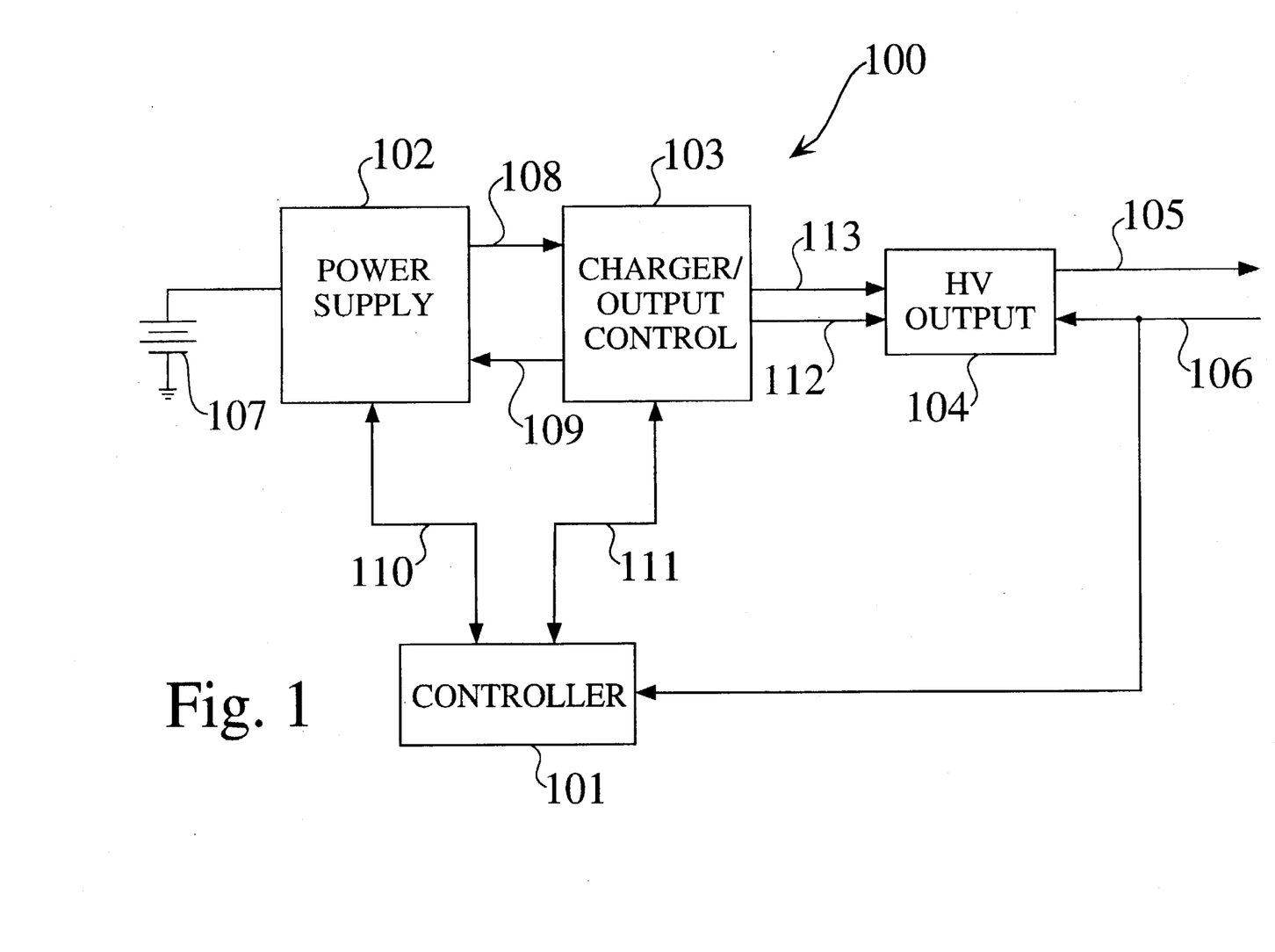
FIG. 1 is a block diagram of an ICD in which the present invention can be implemented.

The present invention can be implemented in a high voltage charger of an implantable cardioverter-defibrillator (ICD). An example of such an ICD (ICD 100) is shown in FIG. 1 in block diagram form. In FIG. 1, ICD 100 is powered by a battery 107. Battery 107 is an implanted power source which provides all the energy needs of ICD 100. Power supply circuit 102 generates the various voltage levels needed to operate ICD 100. One novel implementation of power supply 102 is disclosed in a copending patent application ("Copending Application"), filed Jun. 17, 1996, entitled "Power Supply Circuit With a Widely Varying Input Voltage," by Stephen T. Archer and Ken Carroll, Ser. No. 08/660,411, assigned to Ventritex, Inc., which is also the assignee of the present invention. The disclosure of the Copending Application is hereby incorporated by reference in its entirety. In that implementation of power supply circuit 102, power supply circuit 102 draws power from both battery 107 and a signal "VBOOST". Signal "VBOOST", which is represented generally in FIG. 1 by the signal at terminal 109, is generated by a high voltage charger/output controller circuit 103. The various voltages generated by power supply circuit 102 and provided to high voltage charger/output controller circuit 103 are represented generally by the signals of terminal 108.

As mentioned above, high voltage charger/output controller circuit 103 generates signal VBOOST for use by power supply circuit 102. High voltage charger/output controller circuit 103 controls both the charging and the discharging of the storage capacitors in high voltage output circuit 104. Terminal 105 represents the leads coupled to the implanted defibrillation electrodes, at least one of which is placed in or near the patient's right ventricle. Terminal 106 represents leads for sensing the electrical activity in the patient's heart.

Controller 101, which includes a microprocessor and a static random access memory, controls the overall operation of the ICD 100. Controller 101 includes a waveform analyzer for detecting arrhythmias in the patient's heart from the sensed electrical signals. Controller 101 also includes various timers, and a pacing circuit for low voltage level pacing. Low voltage level pacing operation of ICD 100 is described in copending patent application METHOD AND APPARATUS FOR INDUCING FIBRILLATION, Ser. No.

08/568036, filed Dec. 6, 1995, assigned to the assignee of the present application and which is hereby incorporated by reference.

Figure 2:
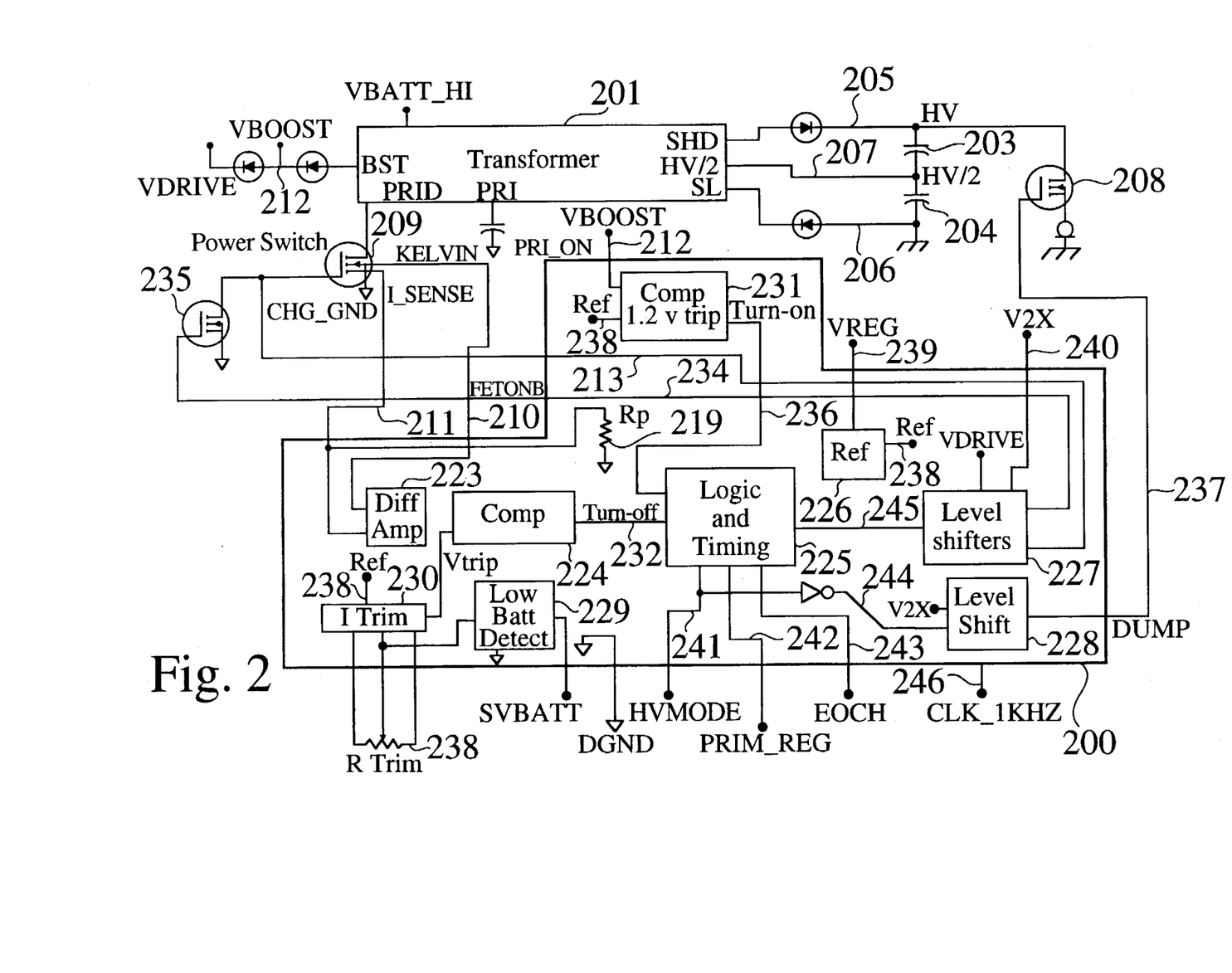
FIG. 2 is a schematic diagram of a high voltage charger in the ICD of FIG. 1.

FIG. 2 is a schematic diagram showing high voltage charger 200 in high voltage charger/output controller circuit 103. Also shown in FIG. 2 is DC-DC converter 201, which provides the charging current to the storage capacitors of high voltage output circuit 104. In the present embodiment, output signals "HV" and "HV/2", represented respectively in FIG. 2 by reference signals 205 and 207, along with ground reference 206, provide currents to charge two series connected capacitors 203 and 204. In the present embodiment, capacitors 203 and 204 are each charged to substantially the same voltage of HV/2. Capacitors 203 and 204 are discharged into an "H" bridge circuit, which allows a biphasic voltage waveform to be provided to defibrillate the patient's heart. When not in "high voltage mode" (see below), transistor 208 discharges capacitors 203 and 204 in response to control signal 237 ("DUMP"), which is obtained by level-shifting an inverted version of control signal HV_MODE at terminal 244. As shown in FIG. 2, a level shifter 228 shifts control signal 208 to the V2X power supply voltage (terminal 240), which is typically six volts.

In the present embodiment, high voltage charger 200 operates in two distinct modes: a 1 KHz mode, which uses a constant 1 KHz switching rate, and a variable rate mode, designed to supply a substantially constant average charging current. Under the 1 KHz mode, based on the clock signal at terminal 246, a relatively low current is drawn from the power source, so that a relatively low charging rate results. The variable rate mode, called "rapid charging", has a variable switching frequency (5–60 KHz) and a relatively constant input current from the power supply, resulting in a maximum output charging rate. To charge capacitors 203 and 204 for a defibrillating discharge, a three-phase charging sequence is provided, consisting of: (i) an initial phase of charging at the 1 KHz mode (the "warm up" period), (ii) a rapid charging phase, and (iii) a final phase of charging at the 1 KHz mode (the "warm down" period). The power supply circuit described in the Copending Application switches its power source from battery 107 to signal VBOOST at the start of the warm up period, and switches back to battery 107 at the end of the warm down period. The initial period of 1 KHz switching allows power supply 102 to switch its regulated supply source to signal VBOOST from system battery 107, whose voltage declines during charging. The ending period of 1 KHz switching allows the battery voltage to recover before being switched back to system battery 107 by power supply circuit 102. The operation of high voltage charger 200 is summarized in the state and flow diagrams of FIGS. 5–7.

Figure 5:
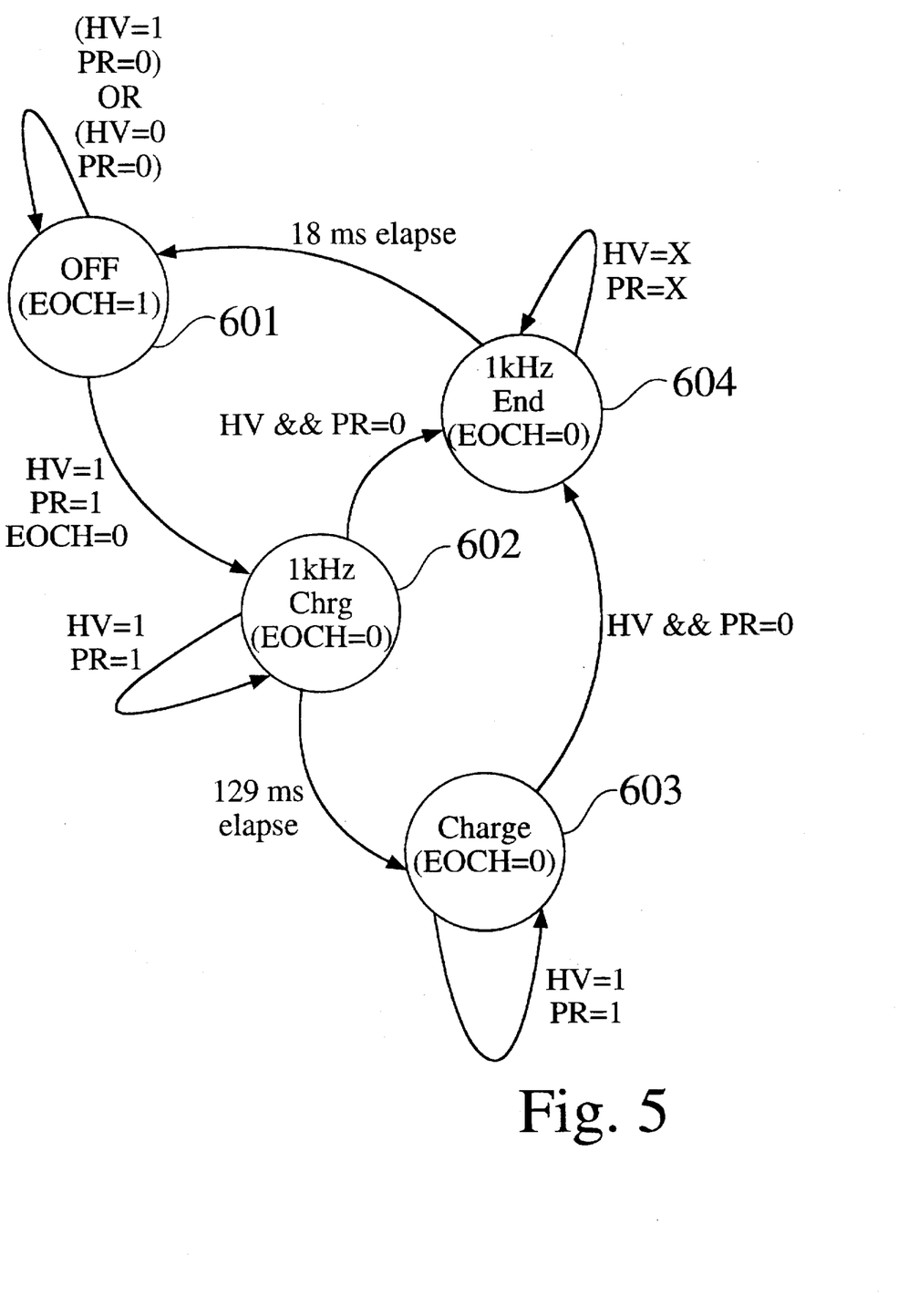
FIG. 5 shows a state machine for the overall operation of the high voltage charger.

FIG. 5 shows a state machine 600 for controlling high voltage charger 200's overall operation. As shown in FIG. 5, high voltage charger 200 has four states labeled states 601–604, respectively. State 601 is the "Off" state. States 602, 603 and 604 are, respectively, the warm up state, the rapid charging state and the warm down state. State machine 600 is controlled by two control signals: HV_MODE ("high voltage mode") and PRIM_REG ("primary regulation"), provided in FIG. 2 at terminals 241 and 242, respectively. From state 601, when signals HV_MODE and PRIM_REG are asserted, warm up state 602 is entered for a 129-millisecond warm up period. The output signal EOCH ("end of charging") at terminal 243 is deasserted to indicate a charging phase. In state 602, if either signal HV_MODE or signal PRIM_REG is deasserted during the warm up period, state 602 is aborted and state 604 is entered. At the end of the warm up period, rapid charging state 603 is entered. State machine 600 remains in rapid charging state 603 until either signal HV_MODE or signal PRIM_REG is deasserted. At that time, warm down state 604 is entered. State machine 600 remains in warm down state 604 for 18 milliseconds, before returning to "off" state 601. Output signal EOCH at terminal 243 is asserted in state 601 to indicate completion of charging.

Figure 3:
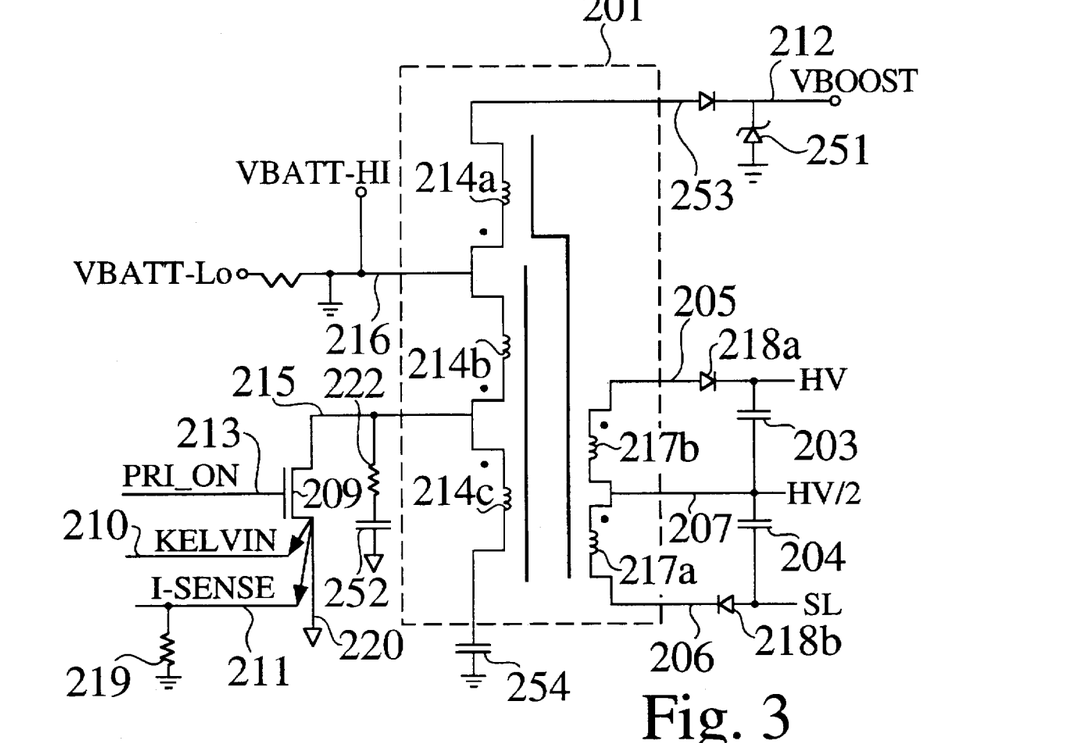
FIG. 3 shows a circuit suitable for implementing a DC-DC converter of the invention.

FIG. 3 shows a circuit suitable for implementing DC-DC converter 201. As shown in FIG. 3, DC-DC converter 201 includes secondary windings 217a and 217b, which are inductively coupled to primary winding 214c. Windings 214a and 214b are also inductively coupled to primary winding 214c. Capacitor 254 is provided in DC-DC converter 201 to ensure ripple-free operation. A switch 209 periodically closes to induce a charging current in secondary windings 217a and 217b to charge capacitors 203 and 204 through rectifying diodes 218a and 218b. In this embodiment, switch 209 can be provided by a HEXSENSE current sensing device available from International Rectifier Corporation. HEXSENSE current sensing device 209 is a power metal-oxide-semiconductor (MOS) field effect transistor (FET) with a current sensing capability. In HEXSENSE current sensing device 209, two output source terminals, respectively called the "Kelvin source pin" (pin 210) and the "I_sense source pin" (pin 211) are provided. I_sense source pin 211 provides a small current (relative to the current in power source terminal 220) which, when measured with respect to the voltage of Kelvin source pin 210, is proportional to the drain current in the HEXSENSE current sensing device 209. Kelvin source pin 210 provides the source voltage of HEXSENSE current sensing device 209. In FIG. 3, resistor 219 couples the current in I_sense source pin 211 to ground. The voltage drop across resistor 219 is thus a quantity proportional to the current in HEXSENSE current sensing device 209. Resistor 222 and capacitor 252 form a series connected RC circuit, which couples the drain terminal of switch 209 to the ground reference voltage in order to reduce switching noise.

HEXSENSE current sensing device 209 is driven at terminal 213 by a signal PRI_ON. Signal PRI_ON is generated by high voltage charger 200 in the manner described in further detail below. When signal PRI_ON switches on HEXSENSE current sensing device 209, current is shunted from winding 214c to HEXSENSE current sensing device 209 rapidly, so that the inductance in DC-DC converter 201 drives signal "VBOOST" at terminal 212 to a high voltage rapidly. In this embodiment, signal VBOOST stays at voltage Vhi (10–16 volts) when HEXSENSE current sensing device 209 is on.

When signal PRI_ON switches off HEXSENSE current sensing device 209, triggered by detection of a predetermined current level in I_sense source pin 211, inductance in DC-DC converter 201 drives the signal at terminal 253 negative. With diode 251 preventing signal VBOOST from going below the ground reference voltage, signal VBOOST is consequently driven to the ground reference voltage. Thereafter, while HEXSENSE current sensing device 209 remains off, the magnetic field in the core of DC-DC converter 201 collapses, allowing signal VBOOST to rise from the ground reference voltage to approximately 1.2–3.3 volts, depending on the levels of charge stored in capacitors 203 and 204. As described below, in rapid charging state 603 (FIG. 5), this rise in voltage in signal VBOOST is used to trigger signal PRI_ON to switch on HEXSENSE current sensing device 209. The triggering of signal PRI_ON at terminal 213 is provided by a logic and timing circuit within high voltage charger 200 described below.

Figure 4:
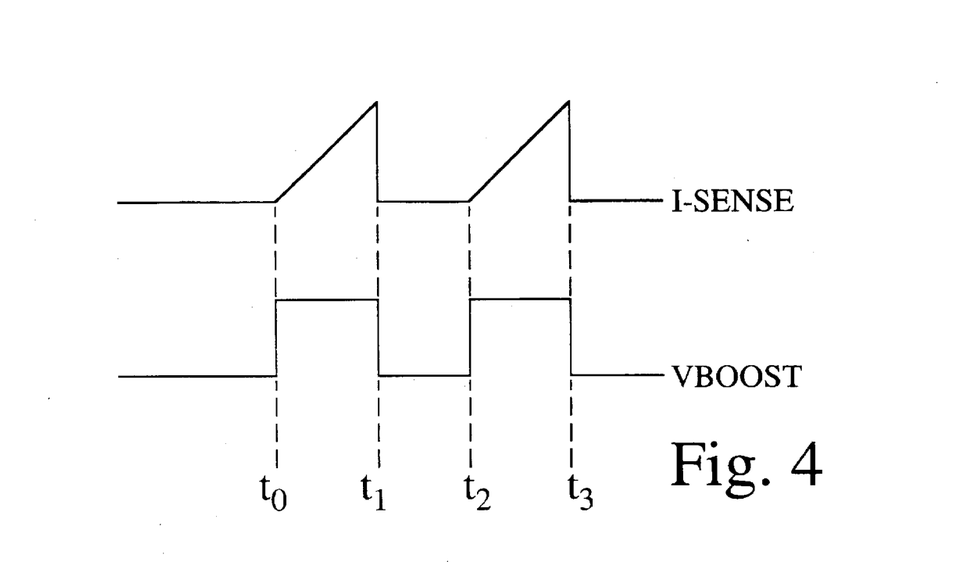
FIG. 4 shows the timing relationship between signal VBOOST and signal I_sense during a rapid charging mode.

The timing relationship between signal VBOOST and signal I_sense at terminals 212 and 211, respectively, during rapid charging state 603 is illustrated in FIG. 4. Referring to FIG. 2, the differential voltage between Kelvin source pin 210 and I_sense source pin 211, which is proportional to the current in HEXSENSE current sensing device 209, is amplified by a differential amplifier 223 and compared in comparator 224 to a preset threshold voltage $V_{trip}$. When the amplified differential voltage exceeds $V_{trip}$, i.e. the current in HEXSENSE current sensing device 209 exceeds a predetermined threshold, a control signal "turn-off" at terminal 232 is asserted by comparator 224. In the embodiment shown in FIG. 2, $V_{trip}$ is generated by trimming resistor 238 from an internally generated voltage REF at terminal 238. Trimming resistor 238 is also used to provide a low battery condition detection circuit 229 a voltage generated from signal REF. Alternatively, $V_{trip}$ can also be generated by a digital-to-analog converter, using a value specified by controller 101. During rapid charging, logic and timing circuit 225 passes the asserted signal at terminal 245 to level shifter 227 to generate complementary control signals at terminals 213 and 234. The control signal at terminal 213 is signal PRI_ON. In this instance, signal PRI_ON is deasserted to switch off HEXSENSE current sensing device 209. The complementary signal at terminal 234 turns on transistor 235, so as to quickly pull the gate voltage in HEXSENSE current sensing device 209 to the ground reference voltage. FIG. 4 shows the voltage on I_sense source pin 210 abruptly jumps to ground level at each of times $t_1$ and $t_3$, causing corresponding jumps to ground voltage level by signal VBOOST at terminal 212. However, as mentioned above, during the time period between $t_1$ and $t_2$, when HEXSENSE current sensing device 209 remains off, the voltage of signal VBOOST rises at a rate determined by levels of charge stored in capacitors 203 and 204. Thus, the frequency of operation in rapid charging state 603 is the reciprocal of the sum of the on-time $(t_1-t_0)$ and the off-time $(t_2-t_1)$ of HEXSENSE current sensing device 209.

Referring back to FIG. 2, signal VBOOST at terminal 212 is compared in comparator 231 with a reference voltage REF at terminal 238, which is derived from signal VREG at terminal 239. Signal VREG is generated by the power supply circuit described in the Copending Application. In this embodiment, when signal REF at terminal 238 exceeds 1.2 volts, a control signal "turn_on" at terminal 236 is asserted, and logic and timing circuit 225 deasserts a control signal at terminal 245. The control signal at terminal 245 causes level shifter 227 to assert control signal PRI_ON at terminal 213 and to deassert the complementary signal "FETONB" at terminal 234. At this time, i.e. either time $t_0$ or time $t_2$ of FIG. 4, current begins to flow in HEXSENSE current sensing device 209, and signal VBOOST at terminal 212 increases rapidly to its maximum value (~15 volts in this embodiment). The present embodiment is designed such that the average current over time in HEXSENSE current sensing device 209 is 2.3 amps, which is believed to be an optimum current for maximizing battery life and for minimizing charge time. Controller 101 (FIG. 1) discharges storage capacitors 203 and 204 by deasserting control signal HV_MODE at terminal 241. Control signal HV_MODE, in turn, asserts control signal "DUMP" at terminal 237, which switches on transistor 208. Transistor 208 couples capacitor 203 to the ground reference voltage. The operation of high voltage charger 200 under rapid charging state 603 is summarized in the flow diagram of FIG. 6.

Figure 6:
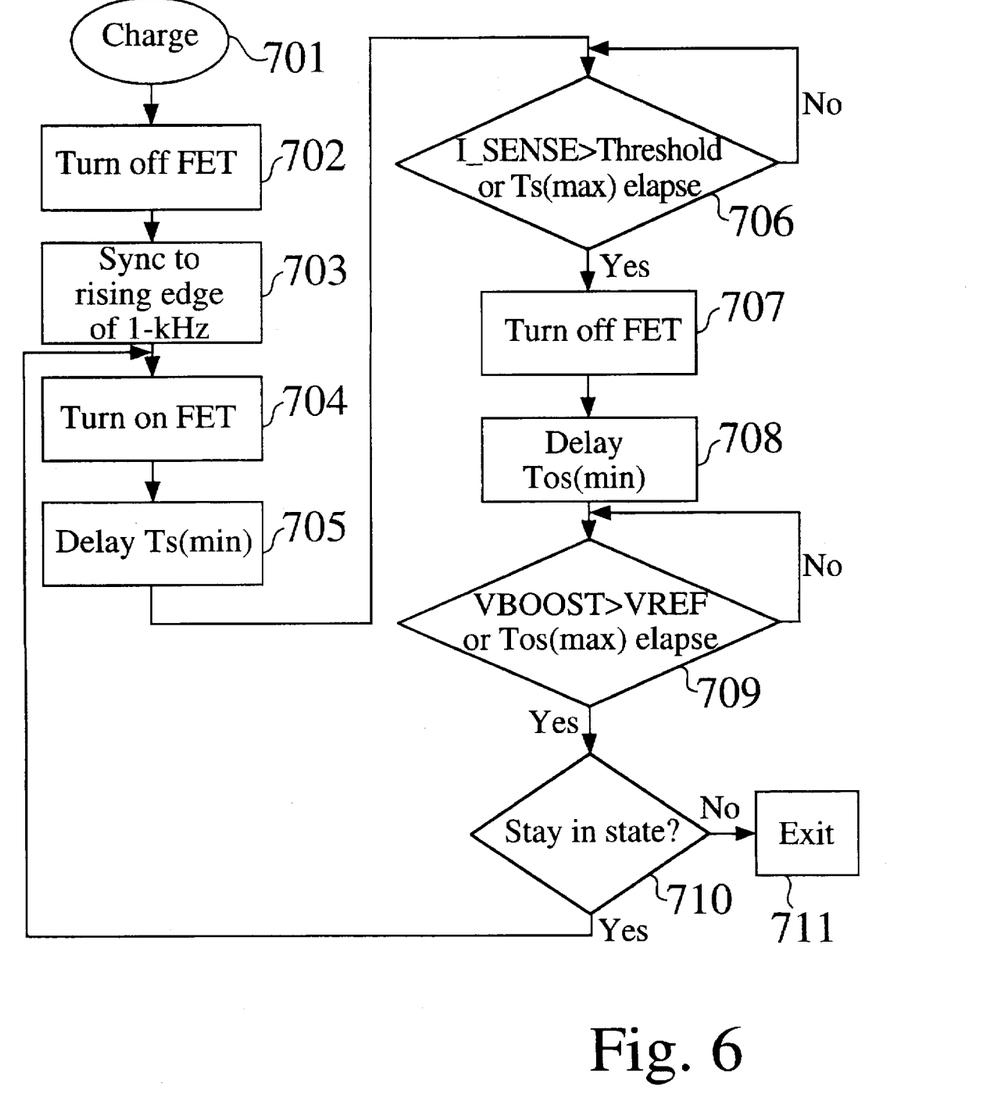
FIG. 6 is a flow diagram showing the operation of the high voltage charger when operating in the rapid charging mode.

As shown in FIG. 6, the beginning of rapid charging state 603 is indicated by reference numeral 701. At step 702, HEXSENSE current sensing device 209 is turned off and, at step 703, high voltage charger 200 waits for synchronization with the rising edge of the 1-KHz clock at terminal 246. At the rising edge of the 1-KHz clock, i.e. step 704, HEXSENSE current sensing device 209 is turned on, and remains on, at step 705, for a time period "Ts(min)," which is typically 10 to 20 milliseconds. Thereafter, at step 706, the differential voltage across I_sense source pin 211 and Kelvin source pin 210 is compared with voltage $V_{trip}$, as described above, to determine if the I_sense current in pin 211 is greater than the predetermined threshold represented by voltage $V_{trip}$. If the I_sense current is greater than this threshold, or when the time elapsed since step 705 exceeds the time period "Ts(max)," typically 70 to 140 milliseconds, HEXSENSE current sensing device 209 is switched off. Then, at step 708, high voltage charger 200 waits for a period "Tos(min)," which is typically between 2 to 4 microseconds. Then, high voltage charger 200 waits until signal VBOOST to exceed the reference voltage VREF, as described above, or when the maximum allowable off-time "Tos(max)" elapses. Tos(max) is typically 2 to 3 milliseconds. At step 710, the control signals HV_MODE and PRIM_REG at terminals 241 and 242 are checked to determine if high voltage charger 200 should remain in state 603. If so, steps 704–710 are repeated. Otherwise, state 603 is exited at step 711.

Figure 7:
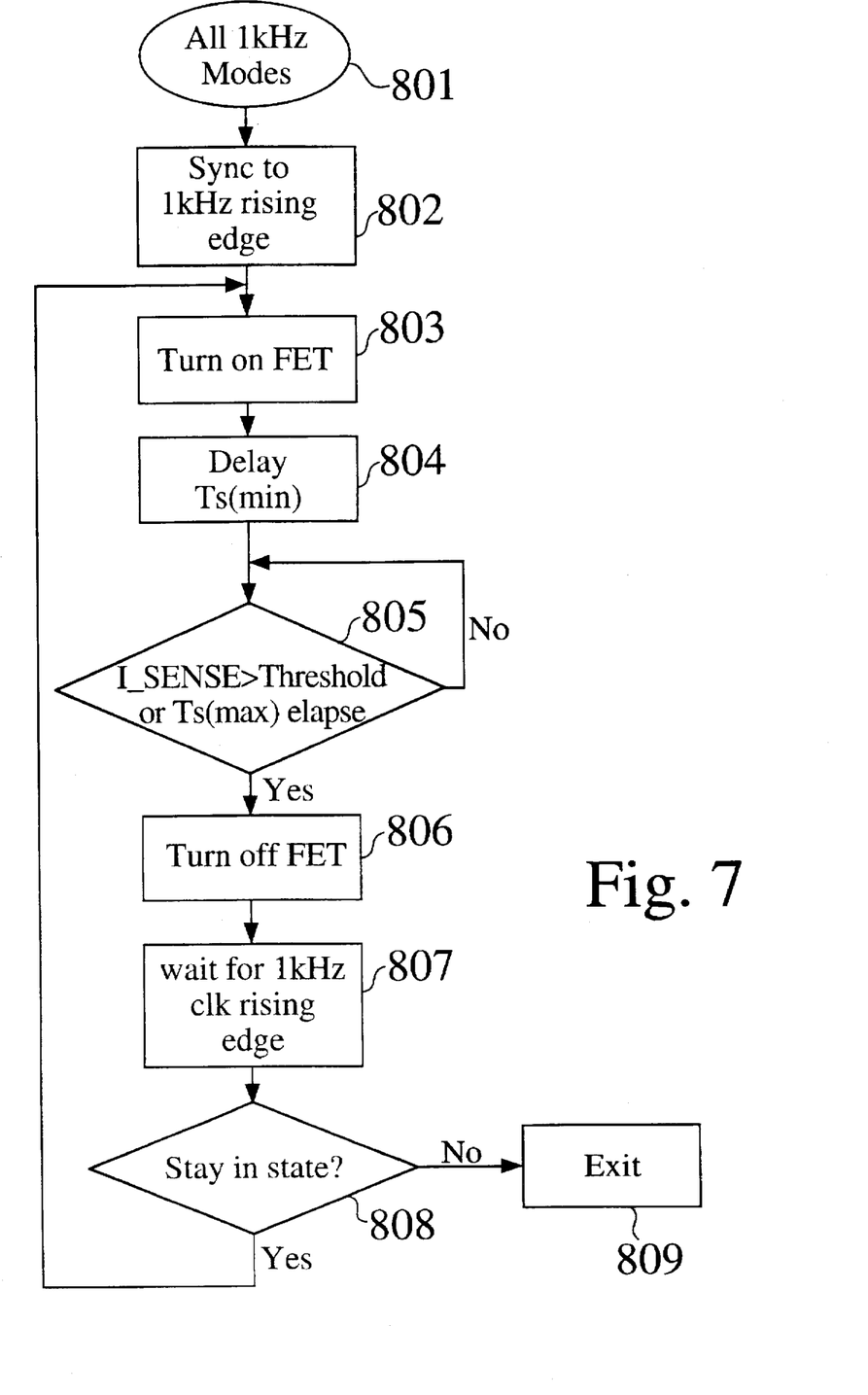
FIG. 7 is a flow diagram showing the operation of the high voltage charger when operating in the 1 KHz switching mode.

During 1 KHz charging states 602 and 604, logic and timing circuit 225 switches off HEXSENCE current sensing device 209 at the rate of 1 KHz. The operation of high voltage charger 200 under 1 KHz mode in each of states 602 and 604 is summarized in the flow diagram of FIG. 7. As shown in FIG. 7, the beginning of 1 KHz charging state 602 or 604 is indicated by reference numeral 801. At step 802, high voltage charger 200 waits to synchronize with the rising edge of the 1-KHz clock at terminal 246. At the rising edge of the 1-KHz clock, i.e step 803, HEXSENSE current sensing device 209 is turned on, and remains on, at step 804, for the time period Ts(min) discussed above. Thereafter, at step 805, the differential voltage across I_sense pin 211 and Kelvin pin 210 is compared with voltage Vtrip, as described above, to determine if the I_sense current in pin 211 is greater than the predetermined threshold represented by voltage Vtrip. If the I_sense current is greater than this threshold, or when the time elapsed since step 804 exceeds the time period Ts(max), HEXSENSE current sensing device 209 is switched off. Then, at step 807, high voltage charger 200 waits, once again, for the rising edge of the 1 KHz clock. At step 808, for state 602, the control signals HV_MODE and PRIM_REG at terminals 241 and 242 are checked to determine if high voltage charger 200 should remain in state 602 or state 604. If so, steps 803–808 are repeated. Alternatively, the maximum time allowed in state 602 or state 604 is also examined. For state 602, as discussed above, the maximum time allowed (i.e. "warm up" time) is 129 milliseconds and, for state 604, the maximum time allowed (i.e. "warm down" time) is 18 milliseconds. If the control signals HV_MODE and PRIM_REG at terminals 241 and 242 indicate that high voltage charger should no longer remain in state 602, or the maximum allowable time for state 602 or state 604 is exceeded, 1-KHz charging state 602 or 604 is excited at step 809.

The above detailed description is provided to illustrate specific embodiments of the present invention, and is not intended to limit the present invention. Numerous modifications and variations within the scope of the present invention are possible. The present invention is defined by the appended claims below.

We claim:

1. A high voltage charger for use in an implantable defibrillator for providing a charging current to an output load, comprising:
   a transformer providing said charging current by inductively coupling an electrical current drawn from a power source;
   a switch for alternately switching on and off said electrical current;
   a sensor sensing the magnitude of said electrical current; and
   a control circuit coupled to said switch and said sensor for controlling said switch, such that, when said sensor senses said magnitude of said electrical current to exceed a predetermined value, said control circuit disables flow of said electrical current, said predetermined value selected such that said current drawn from said power source has a predetermined average value.

2. A high voltage charger as in claim 1, wherein said sensor is built into said switch.

3. A high voltage charger as in claim 1, wherein said predetermined value is set by a resistance value.

4. A high voltage charger as in claim 1, wherein said predetermined value is set by a specifying an input value of a digital-to-analog converter.

5. A high voltage charger as in claim 1, wherein said control circuit is coupled to a voltage in a boost winding of said transformer, said control circuit enabling flow of said electrical current in said switch when said voltage in said boost winding exceeds a second predetermined threshold.

6. A high voltage charger as in claim 5, wherein said second predetermined threshold is exceeded by said voltage in said boost winding when a magnetic field in said transformer collapses.

7. A high voltage charger as in claim 1, wherein said control circuit controls said switch selectively at either a fixed frequency or a variable frequency.

8. A high voltage charger as in claim 1, wherein said control circuit controls said electrical current in a predetermined cycle, said predetermined cycle consisting of a first fixed frequency phase, a variable frequency phase and a second fixed frequency phase.

9. A high voltage charger as in claim 1, wherein said charging current being provided to charge an output capacitor, said high voltage charger further comprising a transistor for discharging said output capacitor upon receiving a control signal from said control circuit.

10. A high voltage charger as in claim 1, wherein said power source is a battery.

11. A method for providing a charging current to an output load of an implantable defibrillator, comprising the steps of:
    providing said charging current by inductively coupling an increasing electrical current from a power source;
    providing a switch for alternately switching on and off said electrical current;
    sensing the magnitude of said electrical current; and
    controlling said switch, such that, when said sensor senses said magnitude of said electrical current exceeds a predetermined value, said control circuit disables flow of said electrical current, said predetermined value selected such that said current drawn from said power source has a predetermined average value.

12. The method of claim 11, wherein said sensing step is carried out by a sensor built into said switch.

13. A method as in claim 11, wherein said predetermined value is set by a resistance value.

14. A method as in claim 11, wherein said predetermined value is set by a specifying an input value of a digital-to-analog converter.

15. A method as in claim 11, wherein said step of controlling said switch includes the step of monitoring a voltage in a boost winding of a transformer which inductively couples said charging current to said electrical current, said step of controlling enabling flow of said electrical current in said switch when said voltage in said boost winding exceeds a second predetermined threshold.

16. A method as in claim 15, wherein said second predetermined threshold is exceeded by said voltage in said boost winding when a magnetic field in said transformer collapses.

17. A method as in claim 11, wherein said step of controlling said switch controls said switch selectively at either a fixed frequency or a variable frequency.

18. A method as in claim 11, wherein said step of controlling said switch controls said electrical current in a predetermined cycle, said predetermined cycle consisting of a first fixed frequency phase, a variable frequency phase and a second fixed frequency phase.

19. A method as in claim 11, wherein said charging current being provided to charge an output capacitor, said method further comprising the step of coupling a transistor to discharge said output capacitor upon receiving a control signal from said control circuit.

20. A method as in claim 11, wherein said step of providing said charging current includes the step of providing a battery as said power source.

* * * * *